Figure 6:
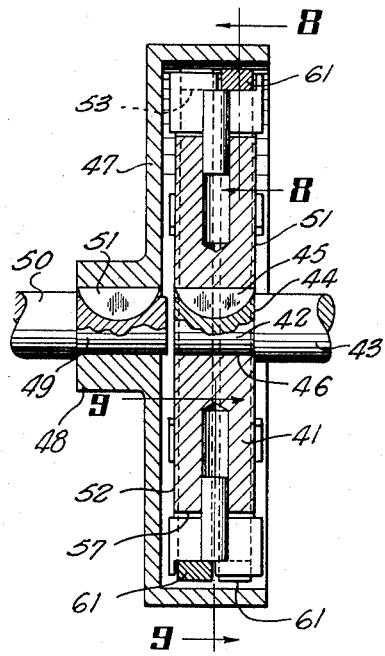

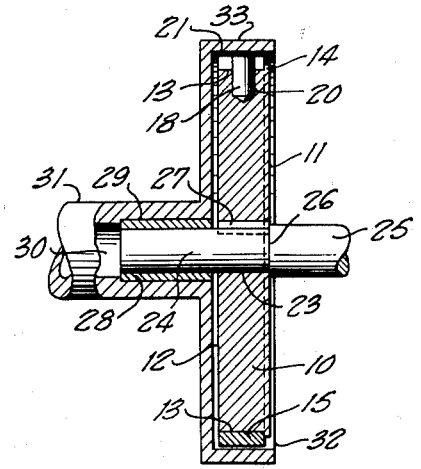
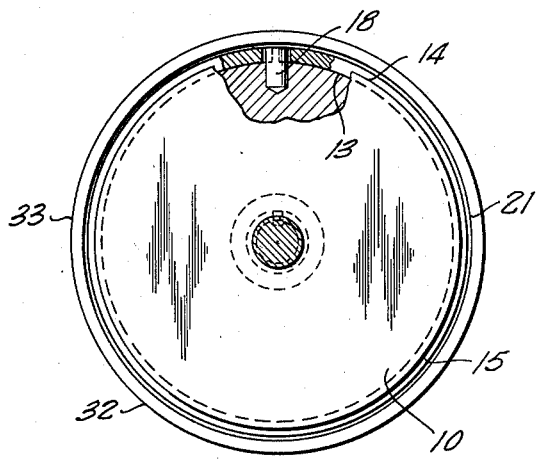
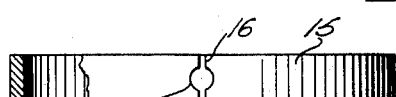
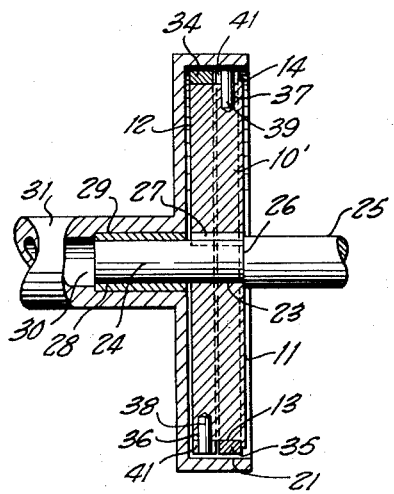
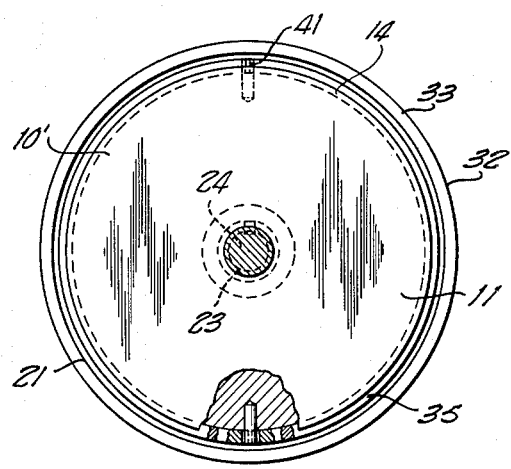
INVENTOR.
John C. Slonneger
BY
Shley & Shley
ATTORNEYS Oct. 11, 1955  J. C. SLONNEGER  2,720,301
SPEED RESPONSIVE FRICTION CLUTCHES
Filed July 27, 1953  2 Sheets-Sheet 2

INVENTOR.
John C. Slonneger
BY
Shley & Shley
ATTORNEYS

United States Patent Office 2,720,301
Patented Oct. 11, 1955

2,720,301

SPEED RESPONSIVE FRICTION CLUTCHES

John C. Slonneger, Dallas, Tex., assignor to The Continental Supply Company, Dallas, Tex., a corporation of Delaware Application July 27, 1953, Serial No. 370,276

5 Claims. (Cl. 192—105)

This invention relates to new and useful improvements in friction clutches.

In the prior art, so far as at present is known, clutch devices of the class described usually depend upon centrifugal force alone for creating a pressure between the friction surfaces, and usually rely upon springs or their equivalents to retract the friction elements and hold such elements in retracted position until the centrifugal force reaches a pre-determined value due to speed of rotation. There are two major objections to this type of construction. First, the springs themselves are subjected to centrifugal force which disturbs their proper functioning, and second, there must of necessity be a considerable increase in speed of rotation, for the desired full clutching effect, over the speed of rotation for the first contact of the friction elements, which causes sluggish engagement and vice versa, sluggish disengagement. Some clutches do have a certain amount of servo-action which action is usually incidental and is positively effective in one direction of rotation, and negatively effective in the opposite direction of rotation.

One object of the invention is to provide an improved clutch wherein the pressure produced between the friction elements is augmented by servo-action, independent of the direction of rotation, and which clutch can be produced with a simple and economical construction.

Another object of the invention is to provide an improved servo-centrifugal clutch wherein comparatively hard metals or hard materials having low coefficients of friction may be employed in the friction elements due to the fact that servo-action can produce relatively high pressure with relatively small centrifugal force.

A further object of the invention is to produce an improved servo-centrifugal clutch of low wear rate due to the use of hard friction elements.

Yet another object of the invention is to provide an improved clutch wherein a friction member resiliently embraces a driving element and is free to move outwardly under centrifugal force into engagement with a driven element, the friction member being positively protected against excessive flexure or damage by the application of centrifugal force of large magnitude.

Still another object of the invention is to provide an improved clutch of the character described which will give unusually quick snap-action when provided with friction elements having the customary high coefficients of friction.

Another object of the invention is to provide an improved clutch including a driven member having a face surrounding and normally spaced from the outer face of a friction ring frictionally embracing a driving member, but held against independent rotation thereon, in which clutch, under increased speed of rotation, the outer face of the ring will frictionally engage the surrounding face of the driven member, and the ring, being positively driven and tending to increase its expansion due to the applied circumferential stress, exerts a greater pressure on the surrounding face of the driven element, whereby a self-energizing action, known as servo-action, is obtained.

A construction designed to carry out the invention will be hereinafter described together with other features of the invention.

Figure 7:
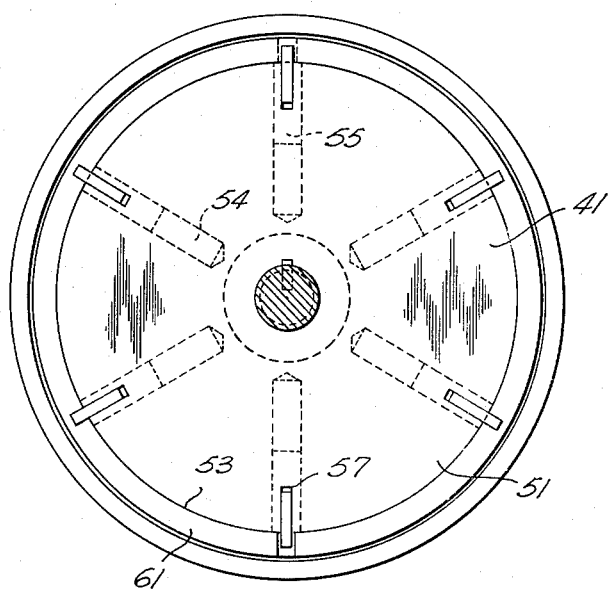
Figure 8:
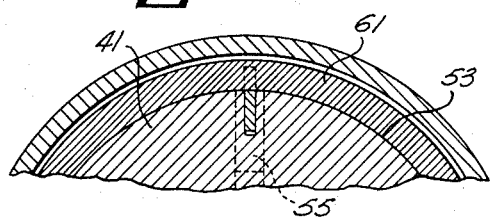
Figure 10:
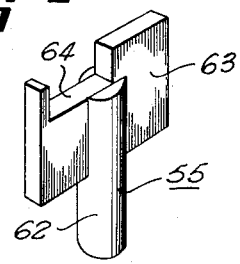
Figure 9:
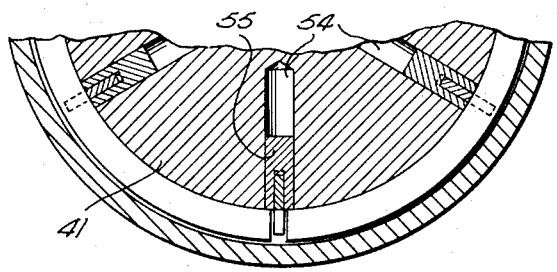
Figure 11:
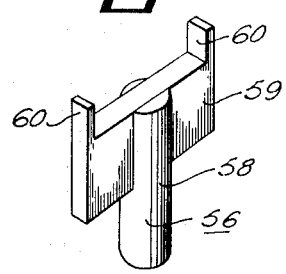

The invention will be more readily understood from a reading of the following specification and by reference to the accompanying drawings, wherein examples of the invention are shown, and wherein:

Fig. 1 is a transverse, sectional view of a centrifugal clutch constructed in accordance with the invention, Fig. 2 is a side elevation of the clutch shown in Fig. 1, portions of the friction ring and the driver or rotator being broken away and shown in section, Fig. 3 is a plan view of the friction ring, a portion at one side being broken away and shown in cross-section, Fig. 4 is a view similar to Fig. 1, showing a modified form wherein two friction rings are employed, Fig. 5 is a side elevation of the clutch shown in Fig. 4, portions of the friction rings and the driver or rotator being broken away and illustrated in section, Fig. 6 is a transverse, sectional view of another form of clutch constructed in accordance with the invention, Fig. 7 is a side elevation of the clutch shown in Fig. 6, Fig. 8 is a fragmentary, cross-sectional view taken on the line 8—8 of Fig. 6, Fig. 9 is a fragmentary, cross-sectional view taken on the line 9—9 of Fig. 6, Fig. 10 is an isometrical view of one of the driving lugs, and Fig. 11 is an isometrical view of one of the retaining lugs.

In the drawings, the numeral 10 designates a cylindrical driver or rotator which is shown in the form of a disk having a flat outer side 11 and a flat inner side 12 connected at the periphery of the rotator by a circular or cylindrical face 13 having a narrow, outwardly directed annular flange 14, the outer side of which is flush with the outer side 11 of said rotator. The face 13 of the rotator is embraced by a split annular friction ring 15 which abuts the flange 14 along its inner side 12 of the rotator. This ring is split as is shown at 16 in Fig. 3, and the transverse edges of the split ends of said ring have central semi-circular recesses 17.

The friction ring 15 is made of suitable resilient metal or other suitable material, and has an internal diameter slightly less than the external diameter of the face 13, whereby it is necessary to expand the split ring to permit it to be engaged around said face. Thus, the ring normally tends to contract and therefore grips the periphery of the rotator. In order to insure concurrent rotation of the ring with the rotator, a driving lug 18 is mounted on the periphery of the said rotator and engages in the recesses 17 in the split 16. This lug may be in the form of a cylindrical pin pressed or driven into a correspondingly shaped recess 20 extending radially inwardly in the rotator from the face 13 thereof.

The rotator has a central bore 23 in which is snugly fitted the reduced end or shank 24 of a drive shaft 25. The annular shoulder 26 at the juncture between the shaft and its shank abuts the outer face 11 of the rotator and said shank extends beyond the inner face 12 of said rotator. A key 27 engaging in the bore 23 and seated in the shank 24 connects the shaft 25 to the rotator. The extending end of the shank 24 has a bushing 28 pressed firmly thereon so that said bushing rotates with the shaft. The bushing has a snug rotating fit in an annular race 29 counterbored in the bore 30 of a hub 31 formed integrally with and extending from an annular drum 32. The drum has an integral annular rim 33 around its outer edge overhanging the outer circumferential face of the friction ring.

It is to be noted that the inside flat side 12 of the rotator is spaced from the wall of the drum so as to provide ample clearance therebetween and likewise, when the clutch is not engaged, there is a substantial circumferential clearance or space between the outer face of the ring 15 and the inner annular face of the rim 33. Suitable power means (not shown) is employed to impart rotation to the rotator and said rotator may be driven in either direction. Either adjacent structure or any suitable means may be employed for preventing axial motion between the bushing 28 and the hub 31. The inner face of the drum rim 33 may be suitably ground or otherwise machined, or lined with a suitable metal or other material, as the particular use or operation may require.

In operating the clutch shown in Figs. 1, 2 and 3, power is applied to the drive shaft 25 in either direction since the structure within the rim 33 of the drum 32 is arranged to operate irrespective of the direction of rotation. Rotation is transmitted from the shaft 25 to the rotator 10 which carries the friction ring 15 and this ring is held against independent circumferential movement by the driving lug 18. The drum may be stationary or it could be under independent rotative movement with respect to the rotator. As the rotation of the rotator is continued a centrifugal force is produced which causes the friction ring 15 to expand. At some speed of rotation, which may be previously determined, the initial stress in the ring, due to its frictional or gripping contact with the face 13, is overcome whereby the ring is freed and moves outwardly from the face of the rotator.

As the speed of rotation increases, the ring 15 continues to expand under centrifugal force until it makes a face to face contact with the inner surface or face of the rim 33, whereupon a torque is imposed upon the drum 32. It is obvious that as soon as the frictional engagement between the face 13 of the rotator and the inner face of the ring is broken, the ring is freed from the rotator. One of its recesses 17, however, is still in engagement with the driving lug 18 and its rotation is therefore continued. The expansion of the ring continues and its outer surface increases the force of its frictional engagement with the inner surface of the rim 33, whereby rotation of the drum is set up. Since the resistance of the ring to rotation due to its contact with the rim of the drum is opposed by the lug 18, the ring is urged to tend to open or expand to a still further degree, with the result that the pressure between the ring and the rim is increased. This action is technically known as "servo." Because of this servo-action, the centrifugal force need not be nearly so great, under identical conditions, as in the case where the pressure between the frictional surfaces is produced solely by centrifugal force.

In transmitting torque from the rotator to the drum, the ring is subjected to a circumferential compressive stress. Being arcuate and held at one end only, the ring tends to straighten as this stress is applied to its outer periphery, and hence, the torque application itself acts to increase the pressure of engagement between the drum and the ring. It is further to be noted that this servo-action takes place in either direction of rotation since the clutch structure is symmetrical about the transverse axis extending through the lug 18.

With respect to the inner face of the rim 33 and the outer face of the ring, metals of different characteristics may be employed. Such metals may be integral parts of the members or they may be in the form of laminations or surface modifications. The friction ring 15 and the clutch drum 32 may be made of hard materials or of composite materials such as hardened steel on soft steel or bronze on steel, etc., as may be suited to the circumstances of the power source and the driven machine or medium. Because of the servo effect, the high pressure required for adequate engagement between materials having low coefficients of friction is easily generated by relatively small centrifugal forces. The use of a hard metal promotes long life and uniform operation. It is to be understood that during the initial contact between the ring and the rim or drum there will be some slippage, which however, as the contact continues, will cease. It is pointed out that while hard friction surfaces between the contacting members are desirable, the invention is not to be so limited, since high friction materials may be used at such contacting surfaces. High value friction material produces correspondingly high servo-action.

To disengage the clutch it is only necessary to decrease the speed of rotation and the sequence of the described actions will be reversed. It is to be observed that the resilience of the friction ring 15 serves to produce the retractive force, whereby the clutch is held in disengagement whenever the speed of rotation of the rotator falls below a predetermined value.

In Figs. 4 and 5 another form of the invention is illustrated. It is obvious that the lug or pin 18 of Figs. 1 and 2 has mass and therefore weight. For this reason, the use of a single pin may create design problems in achieving balance in the clutch at high rotational speeds. The modified form shown in Figs. 4 and 5 is the same as the first form in all respects, except as to the rotator, the friction ring and the pin 18. Instead of a single ring 15, two narrow rings 34 and 35 respectively are mounted on the face 13' of the rotator 10' and frictionally engage said face in the same manner as the ring 15. These rings are slightly spaced apart with the outer ring 35 abutting the inner side of the flange 14' and the outer edge of the inner ring 34 substantially flush with the inner side 12' of the rotator. The rotator 10' has two diametrically opposite radial bores or recesses 36 and 37 which receive the lugs or pins 38 and 39 respectively. These recesses are located so as to underlie the central portions of the rings, each of which rings is split and has its ends formed the same as the ring 15, as illustrated in Fig. 3. Each of the pins has its outer projecting end engaged in the recesses 17' between the split ends 16' of one of the rings. Except that the pins and rings balance one another, this structure embodies the same features and results as the single ring form set forth in Figs. 1 and 2.

In the embodiments of the invention hereinbefore set forth it is recognized that the force existing on the lug or pin 18 while transmitting power produces a reactive force or load on the bushing 28 and, hence, a bending moment upon the drive shaft 25 and an opposite reactive force through the rotator 10 and hence, an opposing bending moment on the drive shaft. The opposing bending moments on the driving shafts are not in the same plane and thus produce a relatively small bending moment upon said shaft. The magnitude of this bending moment, which is usually small, may be easily combated so long as the rotator 10 or 10' and the drum 32 are supported on a common shaft as in Figs. 1 to 5 inclusive. In some cases, however, it is desirable to have a clutch structure which also may function as a shaft coupling.

In Figs. 6 to 9 inclusive I have shown a modification of the invention which is adapted to use as a two shaft coupling, together with means of producing assisting centrifugal forces, useful at a relatively low speed of operation. The same reference numerals are applied to elements which are generally the same as those hereinbefore set forth. The rotator 41 is pressed on the reduced end 42 of the drive shaft 43 against a shoulder 44 and secured by a key 45 engaging in the bore 46 of said rotator and seated in said reduced end. The drum 47 has a central hub 48 secured on the adjacent reduced end 49 of a driven shaft 50 by means of a key 51 seated in said shaft and engaging in the bore of said hub. The drive and driven shafts are axially alined and their adjacent ends are spaced apart. The rotator 41 has an outer side 51, an inner side 52 and a peripheral face 53, but the flange 14 is not employed.

The rotator is formed with a plurality of radial bores or recesses 54 which extend inwardly from the center of the peripheral face 53 toward the axis of the rotator. Any suitable number of the recesses may be employed and they are desirably equally spaced about the margin of the rotator. In the particular embodiment of the invention illustrated, six of the bores have been shown.

One diametrically-opposed pair of the bores 54 receives driving pins or lugs 55, shown in Fig. 10, and the remaining bores receive expanding members or weighting elements 56, shown in Fig. 11. Each of the bores has its outer portion transected by a radial slot 57 extending transversely of the rotator between the inner and outer sides thereof.

The expanding members or weighting elements 56 comprise a cylindrical pin 58, adapted to be received in one of the bores 54, having a diametrical head or web 59 set into its outer end and adapted to be received in the slot 57 of said bore. The web carries an upstanding ear 60 at each extremity, and when the weighting elements are positioned in the rotator, as shown in Fig. 6, the ears extend outwardly toward the drum 47 substantially in the planes of the inner and outer sides of the rotator 41.

A pair of split friction rings 61, similar to the rings 34 and 35, encircle the rotator in side-by-side relationship; and resiliently embrace the peripheral face 53 of the rotator. The rings are spaced slightly from one another but are confined on the rotator between the outwardly projecting ears 60 of the elements 56. Each of the rings has a straight transverse cut or split overlying the bores in which the driving pins 55 are positioned, and hence, one ring is shifted 180° with respect to the other.

The driving pins 55 each include a cylindrical shank 62, received in one of the bores 54, and having a transverse driving head 63 on its outer end, received in the slot 57 of that bore. As shown in Fig. 10, the heads 63 project from the shanks substantially the same distance as the ears 60 project from the pins 58. Further, each of the heads has a rectangular notch 64 cut in its outer edge, the notch being positioned in one half or one side of the head so as to receive the body of one of the friction rings 61. The other, un-notched side of the head is inserted into the split or gap of the other of the friction rings and transmits driving force thereto.

With this arrangement, each of the friction rings encircles the rotator 41 and is received between the ears 60 of the members 58. At one side of the rotator, the ring has its medial portion confined in the notch 64 of one of the driving pins 55, and at the opposite side of the rotator, the ring has its gap or split portion intersected by the upstanding head of the opposite driving pin 55. The friction rings are disposed 180° out of rotational alinement, and therefore, full symmetry in the clutch structure and operation obtains.

The operation of this form of the invention is substantially the same as for the previously-described forms with the important exception that the pins 58 and the shanks 62 are freely movable in the bores 54 and therefore respond to centrifugal force. The resilience of the rings 61 is adequate to retract these elements into the bores 54 and to hold the elements so retracted at rotational speeds of the clutch below the critical speed of clutch engagement. Once the critical speed is reached or exceeded, however, the mass of the pins and the shanks respond to centrifugal force and aid in moving the friction rings outwardly into engagement with the clutch drum. At the same time, the elements 55 and 56 function also to restrain the rings against lateral displacement, while the elements 55 function additionally to transmit driving force to the rings. The clutch is completely balanced, the bending moments which are created cancel one another, and full servo-action in both directions of rotation is achieved.

It is noted that the bores 54 have a depth greater than the length of the pins 58 and the shanks 62, and thus may accommodate pins or shanks of greater length and therefore of greater mass. Alternately or in addition, the pins and shanks may be formed of materials of different densities to increase or decrease the friction ring expanding effect. In this manner, as well as by variation in the number of the bores 54, the critical speed of engagement or disengagement of the clutch may be altered over a wide range.

There are several important advantages and improved results common to all of the described forms of the invention. The complete absence of springs for expanding or contracting the friction elements eliminates all problems arising from the use of such springs. In particular, the malfunctioning or complete failure of the springs under centrifugal stress is avoided, and no limits on the rotational speed of the clutch due to the tendency of springs to destroy themselves under high centrifugal forces is encountered. The friction shoes are protected by being operated within their elastic limits. The surrounding clutch drum places a positive limit on the expansion of the rings beyond which they cannot be distorted short of full destruction of the clutch. At the same time, as soon as the rings retract from the drum, a full "free-wheeling" effect is had because of the clearance between the drum and the rings, and the driven shaft is freed completely from the driving shaft. All of the forms of the invention provide servo-action in both directions of rotation, and the last-described forms provide a dynamically-balanced structure.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A clutch including, a rotator having a cylindrical face and radial bores extending inwardly from said face, a drum having a rim provided with an annular face surrounding and radially spaced from the face of the rotator, a resilient ring frictionally engaging around the face of the rotator and free to expand at a predetermined rate of speed of rotation of the rotator into frictional engagement with the face of the rim, a projection carried by one of the radial bores of the rotator and engaged by the ring, whereby the ring is free to expand but is held against independent rotation on the rotator, and expansion members movable in others of the radial bores and confined in said bores by the ring.

2. A clutch including, a rotator having a cylindrical margin with a plurality of radial recesses therein, expansion members in certain of the recesses and freely movable therein radially of the rotator, the members having heads with retaining ears, a driving member in at least one of the recesses, and a split friction ring resiliently embracing the margin of the rotator and having adjacent ends at its split, the driving member extending from the margin of the rotator and abutting one end of the ring, the ring overlying the heads of the expansion members and being received between the retaining ears thereof, and a clutch drum surrounding the ring and spaced therefrom when the clutch is disengaged.

3. A clutch as set forth in claim 2 wherein the recesses are equally spaced circumferentially of the rotator, a driving member is disposed in each of a diametrically-opposed pair of the recesses, the driving members having portions projecting outwardly from the rotator with an offset notch in such portion, the friction ring embracing all of the expansion members and being received in the offset notch of one of the driving members and having the projecting portion of the other driving member abutting one of its ends, and a second friction ring similar to the first ring and disposed parallel thereto in resilient embracement of the rotator, the second friction ring embracing all of the expansion members and having one end abutted by the driving member not abutting the end of the first ring, the second ring being received in the notch of the driving member abutting the end of the first ring.

4. A clutch including, a rotator having a cylindrical face and radial bores extending inwardly from said face, a drum having a rim provided with an annular face surrounding and radially spaced from the face of the rotator, a resilient ring frictionally engaging around the face of the rotator and free to expand at a predetermined rate of speed of rotation of the rotator into frictional engagement with the face of the rim, a projection carried by one of the radial bores of the rotator and engaged by the ring, whereby the ring is free to expand but is held against independent rotation on the rotator, and expansion members slidably mounted in others of the radial bores so as to be free to undergo radial movement only, the ring overlying said expansion members and confining the latter in their respective radial bores.

5. A clutch including, a rotator having a cylindrical margin with a plurality of radial recesses therein and transverse slots in the outer ends of the recesses, expansion members in certain of the recesses and freely movable therein radially of the rotator, the members having heads disposed in said slots and having retaining ears on said heads, a driving member in at least one of the recesses, and a split friction ring resiliently embracing the margin of the rotator and having adjacent ends at its split, the driving member extending from the margin of the rotator and abutting one end of the ring, the ring overlying the heads of the expansion members and being received between the retaining ears thereof, and a clutch drum surrounding the ring and spaced therefrom when the clutch is disengaged.

References Cited in the file of this patent

UNITED STATES PATENTS 1,856,135     Nieman _____ May 3, 1932

FOREIGN PATENTS 714,669     France _____ Sept. 8, 1931
758,939     France _____ Nov. 7, 1933